United States Patent

[11] 3,611,338

[72] Inventor Melvin G. Kramer
Riverton, Wyo.
[21] Appl. No. 25,712
[22] Filed Apr. 6, 1970
[45] Patented Oct. 5, 1971
[73] Assignee Sperry Rand Corporation

[54] FAIL-SAFE PULSE TRAIN MONITOR
12 Claims, 6 Drawing Figs.
[52] U.S. Cl. ..................................... 340/248 P,
328/120, 340/167, 340/253 P
[51] Int. Cl. ....................................... G08b 5/36
[50] Field of Search........................... 340/248 P,
253 P, 167; 328/120

[56] References Cited
UNITED STATES PATENTS
2,812,513 11/1957 Breggin ...................... 340/248 P X
2,984,789 5/1961 O'Brien ...................... 328/120
3,167,754 1/1965 Smit et al. .................. 340/253 P
3,201,773 8/1965 Magee ........................ 340/248 P
3,315,246 4/1967 Huffman et al. ............ 340/248 P
3,350,580 10/1967 Harrison .................... 328/120 X
3,390,387 6/1968 Hugenholtz ................ 340/248 P
3,473,151 10/1969 Moreines et al. .......... 340/167

Primary Examiner—John W. Caldwell
Assistant Examiner—David L. Trafton
Attorney—S. C. Yeaton ABSTRACT: Apparatus for detecting interruptions in a pulse train by causing one or more of a plurality of lamps to light if failure occurs. A bistable circuit permits certain capacitors to charge when the circuit is in one state and to discharge when the circuit is in the other state. The remaining capacitors are charged and discharged in phase opposition to this. Individual lamps are energized in accordance with the charge on the associated capacitor. The average voltage applied to each lamp is insufficient to illuminate the lamp during normal operation. Interruption of a pulse train permits the bistable circuit to remain in one state so that capacitor voltages can accumulate to a level sufficient to illuminate a lamp. The apparatus is made fail-safe by interconnecting the capacitor charging circuits so that one or more lamps are dependent upon the proper operation of every component in the circuit.

INVENTOR.
MELVIN G. KRAMER
BY
ATTORNEY

FAIL-SAFE PULSE TRAIN MONITOR

BACKGROUND OF THE INVENTION

1. Field of the Invention

This invention relates to alarm circuits and, more specifically, to circuits that monitor pulse trains and warn an operator if an interruption occurs in the pulse train.

2. Description of the Prior Art

Numerous devices are available for monitoring a pulse train. In some of these devices, an RC network is arranged so that the capacitor can be charged toward a final value dependent upon the voltage from a steady source. When the charge on the capacitor reaches a threshold value, a lamp is illuminated. The pulse train to be monitored is applied to the circuit so that each pulse discharges the capacitor before it can acquire sufficient charge to illuminate the lamp under normal conditions. This scheme is limited, however, in that the character of the pulses must be held within narrow limits if the capacitor is to be discharged.

More elaborate monitoring devices have been developed in which a bistable circuit is toggled between its two stable states in response to successive pulses in the train to be monitored. These devices employ a first capacitor which is charged during the time that the bistable circuit is in one stable state and a second capacitor is charged during the time that the bistable circuit is in its other stable state. The charges on the capacitors are compared. If the two charges become sufficiently unbalanced because of the disturbance in the pulse train, a threshold circuit is triggered and an alarm is actuated.

In these circuits, however, a failure within the monitoring circuit itself would not be detectable. A subsequent error in the pulse train could then go unnoticed.

SUMMARY OF THE INVENTION

The monitor of the present invention contains a bistable circuit that is toggled in response to successive pulses in the wave train to be monitored. Interruptions in the wave train permit the circuit to stop toggling so as to illuminate one or more of a plurality of normally darkened warning lamps. A delay and latch circuit in the monitor prohibits further toggling if the interruption persists for a time longer than a specified threshold. The lamps are further arranged so that failure of any one opponent within the monitor itself causes at least one of the lamps to become illuminated.

DESCRIPTION OF THE PREFERRED EMBODIMENT

Figure 1:
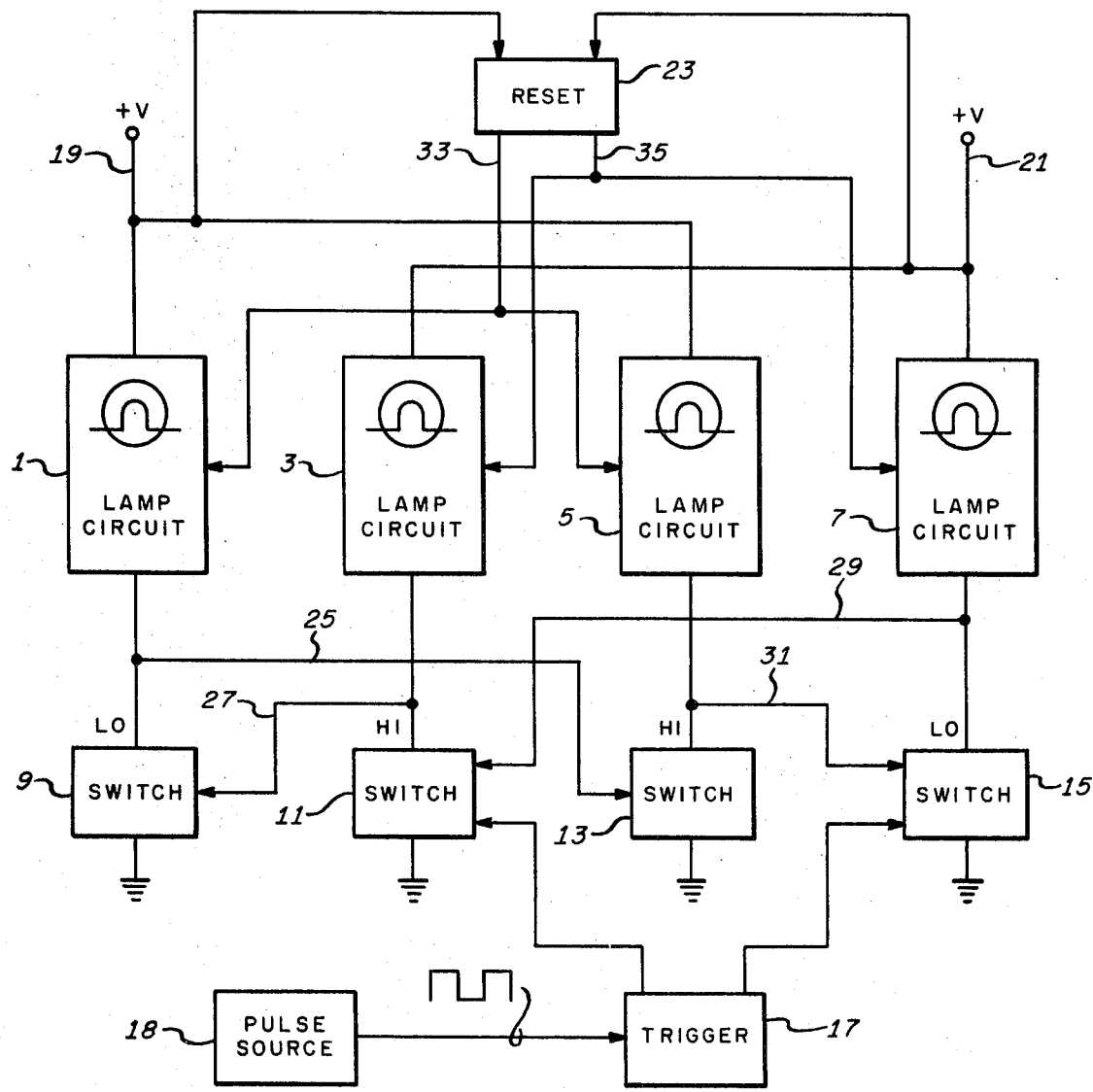
FIG. 1 is a block diagram illustrating the organization of the monitor.

Referring now to FIG. 1, a pulse train monitor includes four lamp circuits: 1, 3, 5 and 7.

These lamp circuits are driven by the voltage level switches 9, 11, 13 and 15, respectively, in response to triggering pulses from a trigger circuit 17 that is actuated from a pulse source 18. The monitor circuit is energized through dual power buses 19 and 21.

If a failure is detected, the circuit is reset by means of a reset circuit 23.

The voltage level switches are interconnected so that the binary state of one of these switches sets the binary state of another switch. Thus, if the switch 9 is switched to another state, a switching signal is applied to the switch 13 through the connecting line 25. Similarly, switch 9 may be switched by a signal from the switch 11 through the line 27. Switch 11, in turn, may receive switching signals from the switch 15 by means of the line 29 and switch 15 may receive switching signals from the switch 13 by means of the line 31.

The lamp circuits 1 and 5 are energized from the line 19 and the lamp circuits 3 and 7 are energized from the line 21. The reset circuit also contains dual output lines 33 and 35 so that the lamp circuits 1 and 5 respond to signals on the line 33 and the lamp circuits 3 and 7 respond to signals on the line 35.

The voltage level switches serve to connect the associated lamp circuits to ground or to provide an open circuit to ground depending upon the condition of the individual switch. The voltage level switches may, for instance, contain a transistor having output terminals connected between the line from the lamp circuit and ground. When the transistor in a give switch is cut off, the switch is said to be in the high-voltage state and when the transistor is conducting, the switch is said to be in the low voltage state. The switches are arranged as reciprocal pairs so that the first pair of switches 9 and 15 are switched to the same binary state at the time that the second pair of switches 11 and 13 are both switched to the opposite state. Thus, as indicated in FIG. 1, at a given point in time the switches 9 and 15 may be in the low voltage state whereas switches 11 and 13 are in the high-voltage state. When the bistable circuit is switched to the opposite binary state, the condition of each of these switches will be reversed. The trigger circuit 17 is arranged to produce a trigger pulse for each input pulse applied to its input terminal. The trigger circuit 17 produces trigger pulses that are capable of turning a transistor in one of the voltage level switches off.

The voltage level switches are interconnected to form a regenerative bistable circuit in which the switching of one voltage level switch ultimately causes all of the remaining switches to reverse their voltage state under normal operating conditions.

Assume, for instance, that the voltage level switches are in the condition indicated in FIG. 1. In this situation, the transistors in the switches 9 and 15 will be conducting and the transistors in the switches 11 and 13 will be cut off. The next trigger pulse will turn off the transistor in the switch 15 but will not affect the transistor in the switch 11.

When the transistor in the switch 15 is turned off, this switch will be transferred to the high state and a voltage will be applied to the switch 11 through the line 29 so as to transfer the switch 11 to the low state. Switch 11, in turn, provides a signal on the line 27 that transfers the switch 9 to the high state and thus provides a signal on the line 25 that transfers the switch 13 to the low state. Thus, each voltage level switch now resides in the opposite state from that which it originally occupied.

The various elements shown in FIG. 1 will be explained in more detail. In brief, however, the circuit is triggered from one stable state to the other when the input pulse train is present. Under these conditions the lamps remain darkened. If the input pulse train is interrupted, or if there is a failure, one or more of the lamps will light. The lamp circuits are used to maintain the average voltage across the lamps at a low level while the circuit is operating normally. This voltage is insufficient to light any of the lamps. If the input signal is removed or a component failure causes the circuit to stop toggling, the voltage across the lamps in the "on" state increases until the lamps become fully illuminated. A delay is provided by controlling the time required for the voltage across the lamps to build up. The voltage level switches are used to switch their respective voltages to ground when their input voltage is above a given voltage level. For instance, assume that the voltage on the switch 13 is switched to the high state. If this voltage has sufficient magnitude, it will drive the transistor in the switch 15 into saturation so that the switch 15 will then be in the low state. If, however, when the switch 13 is transferred to the high state, the magnitude of the voltage at this switch is inadequate, the voltage on the line 31 will be incapable of switching the switch 15 and no toggling action will be possible.

As will be shown, the maximum value of the high voltage at the various switches depends upon the length of time that the switch had been in the low state. If it had been in the low state longer than a given delay time, its subsequent high-state voltage would not be sufficient to switch the next stage and the circuit will become latched.

Figure 2:
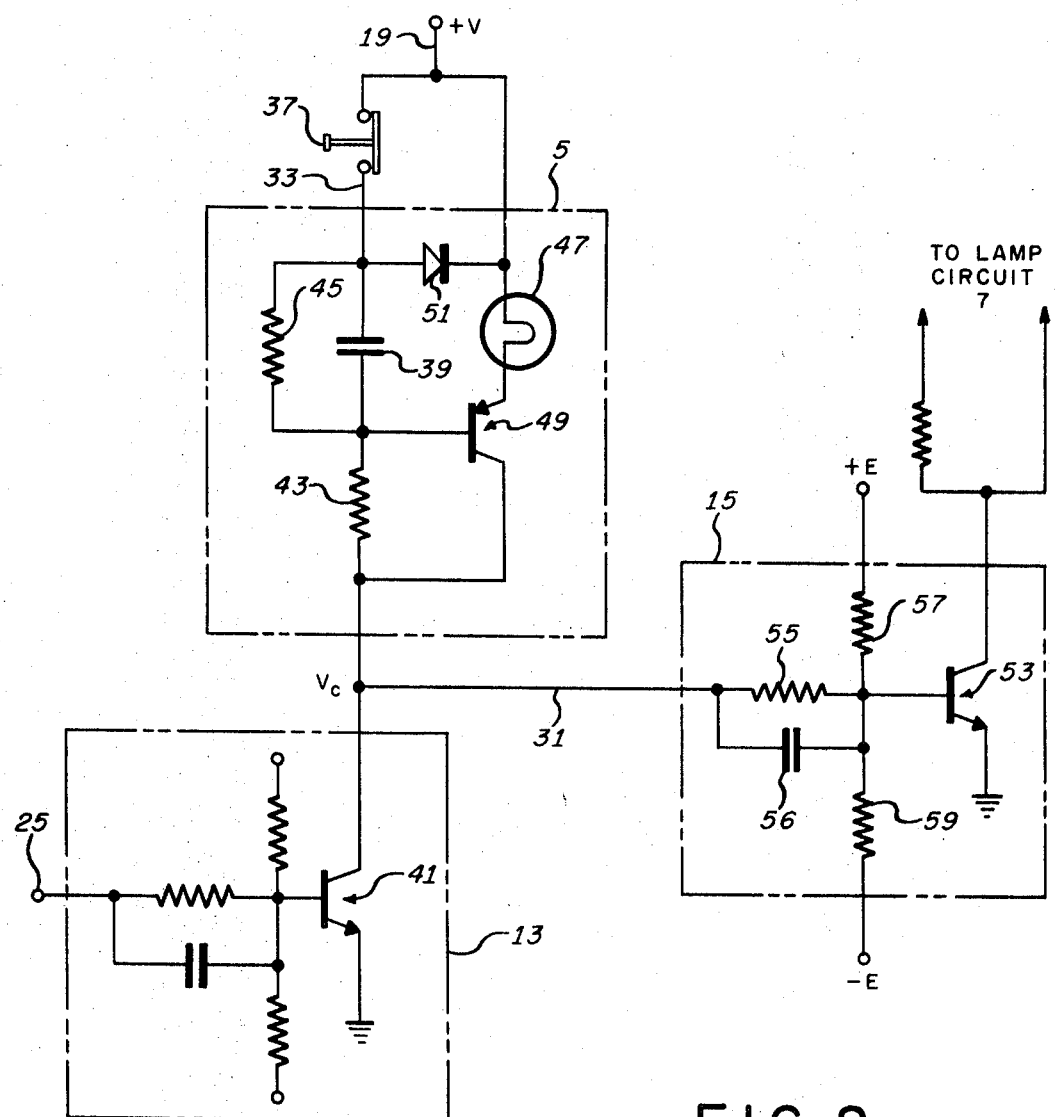
FIG. 2 is a drawing illustrating one stage of a bistable circuit used in the invention.

It can be shown that the four stages depicted in FIG. 1 are required so that at least one lamp will become illuminated in the event of a failure in the pulse train or of any component such as a lamp in the monitor circuit itself. The reset circuit functions to light all lamps momentarily to indicate that each lamp is operable at the reset time. Each lamp circuit is identical and each voltage level switch is identical. Thus, although the circuit diagram of FIG. 2 illustrates only lamp circuit 5 and voltage level switch 15, together with a partial diagram of voltage level switch 13, it will be understood that each stage of the monitor contains identical circuitry. Furthermore, operation of the monitor can be understood by considering the manner in which one of the stages functions.

Referring now to FIG. 2, the lamp circuit 5 is energized from a positive source of voltage through a line 19. Energy is transmitted to the lamp circuit 5 through a reset switch 37 by means of a line 33. The line 33 is connected to a timing capacitor 39. This capacitor is coupled to a switching transistor 41 through a charging resistor 43. The capacitor 39 is shunted by a high resistance discharge resistor 45. An incandescent lamp 47 is connected to the voltage supply and to the emitter of the lamp transistor 49. The vase and collector of the transistor 49 is connected across the charging resistor 43. A diode 51 connects the lamp to one side of the capacitor 39 and cooperates in isolating the stages during reset.

A switching transistor 53 in the voltage level switch 15 is triggered by the voltage appearing at the junction of the collector of the transistor 41 and the lamp circuit. This junction voltage has been designated "$V_c$" for convenience. $V_c$ is applied to the base of the transistor 53 through the series resistor 55 and the bypass capacitor 56. Biasing resistors 57 and 59 couple the base of the transistor 53 to +E and −E biasing voltages.

When the transistor 41 is conducting, $V_c$ is essentially at ground level and therefore in its "low"-voltage state. When the transistor 41 is cut off, $V_c$ is in its "high"-voltage state.

If the lamp 47 were connected directly to the transistor 41, the average value of the lamp voltage would be one-half the supply voltage during normal operation, and the lamp would glow. This would be undesirable in that the lamp should be extinguished during normal operation of the system.

The portion of the circuit including the capacitor 39, the resistor 43 and the transistor 49 is provided to maintain the lamp darkened when operation is normal. These components also cooperate to permit a gradually increasing lamp voltage to occur when the transistor 41 is conducting.

When the transistor 41 is turned off, the capacitor 39 discharges through the lamp 47 and through the base-emitter junction of transistor 49. The base current of the transistor 49 normally brings this transistor to the edge of saturation so that $V_c$ becomes equal to the supply voltage minus the voltage drop across the lamp.

The average lamp voltage can be kept sufficiently low during normal operation to maintain the lamp in the darkened condition, yet to provide sufficient lamp voltage to illuminate the lamp when a predetermined threshold is exceeded.

The value of the supply voltage is much larger than either the collector-emitter voltage across the transistor 49 or the lamp voltage. The resistor 43 is made much larger than the resistance of the lamp filament. In a typical circuit, the supply voltage is designed to be within the range of 22–33 volts. The resistor 43 is typically in the order of 15,000 ohms and the resistor 45 is typically in the order of 500,000 ohms. A type 2N2907 transistor may be used for the lamp transistor 49. The capacitor 39 is typically 0.68 microfarads.

Assuming such values, and taking into account the nonlinearity of the lamp filament, the value of $V_c$ in its high-voltage state can be approximated by the following formula:

$$V_c \text{ (high)} \approx \left(\frac{E_L}{R_L} - \frac{V}{R43}\right) R_{\text{in}} + E \left(\frac{1}{R57} - \frac{1}{R59}\right) \frac{R57 \times R59}{R57 + R59}$$

wherein:

$E_L$ and $R_L$ represent the lamp voltage and resistance, respectively, and the various $R$ symbols relate to the correspondingly numbered resistors in FIG. 2.

The foregoing equation represents the value of $V_c$ in its high state until the transistor 49 saturates. With the transistor 49 saturated, $V_c$ (high) equals $+V-E_L$.

Thus it can be seen that the value of $V_c$ (high) is a function of the lamp voltage and resistance. These relationships and the nonlinear nature of the lamp circuit can be better visualized by referring to the graph of FIG. 3.

As the lamp voltage is increased from zero, $V_c$ increases rapidly until the transistor 49 saturates. $V_c$ then decreases gradually to zero.

Figure 3:
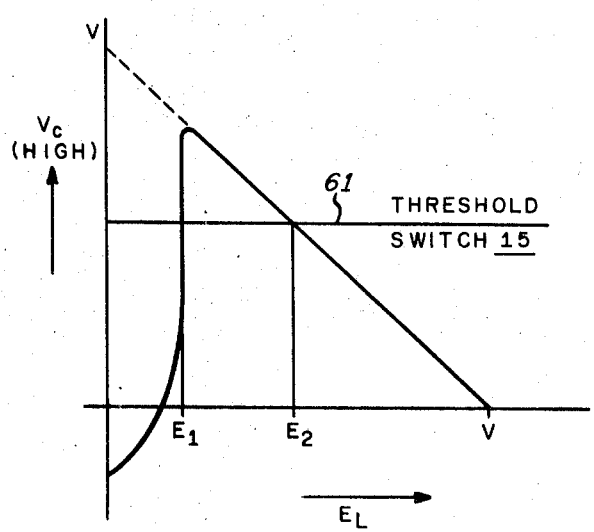
FIG. 3 is a graph useful in explaining the invention.

The transistor 53 is connected to have a switching threshold as indicated by the horizontal line 61 in FIG. 3.

If the transistor 41 remains saturated for only a short time because of a momentary disturbance in the pulse train so that the lamp voltage is less than $E_1$, the value of $V_c$ (high) will remain less than the threshold 61 when the transistor 41 is subsequently turned off. The transistor 53 can not be triggered under these conditions.

If the transistor 41 remains in the conducting state for an abnormally long time, the lamp voltage will exceed $E_2$ and $V_c$ (high) is reduced to a value below the threshold 61. Again, the transistor 53 cannot be triggered. Under these conditions, the circuit will be in a latched state.

When the transistor 53 fails to trigger because the lamp voltage in the lamp circuit 5 is less than $E_1$, the corresponding voltage across the lamp in the lamp circuit 7 (FIG. 1) associated with the voltage level switch 15 rises sufficiently to illuminate that lamp.

When the transistor 53 fails to trigger because the lamp voltage in the lamp circuit 5 is greater than $E_2$, the circuit latches. Under these conditions, any lamps that are illuminated will remain in that condition until the circuit is interrupted by opening the reset switch.

A component failure in a lamp circuit causes the value of $V_c$ (high) to fall below the threshold value so that a lamp in that circuit or another lamp circuit will be illuminated, depending upon the type of component failure that occurs.

The voltage level of $V_c$ can be determined by writing and solving the circuit equations. Thus, the minimum $V_c$ required to switch a voltage level switch is given by:

$$V_c \text{ (min)} = \left[\frac{i_c}{B} + V_{BE}\left(\frac{1}{R55} + \frac{1}{R57} + \frac{1}{R59}\right) - E\left(\frac{1}{R57} - \frac{1}{R59}\right)\right] R55$$

wherein:

$V_{BE}$ = Base-emitter voltage of transistor 53.
$i_c$ = Collector current of transistor 53.
$B$ = Ratio $i_c/i_b$ for transistor 53.
$E$ = Bias voltage The impedance levels indicated in the foregoing equations are chosen so that component failures cause the transistor in a voltage level switch to be continuously on or continuously off, thus preventing bistable operation and causing at least one lamp to be illuminated. Examination of the equations defining the operation of a circuit reveals that proper switching depends upon each essential component in the monitor.

Figure 4:
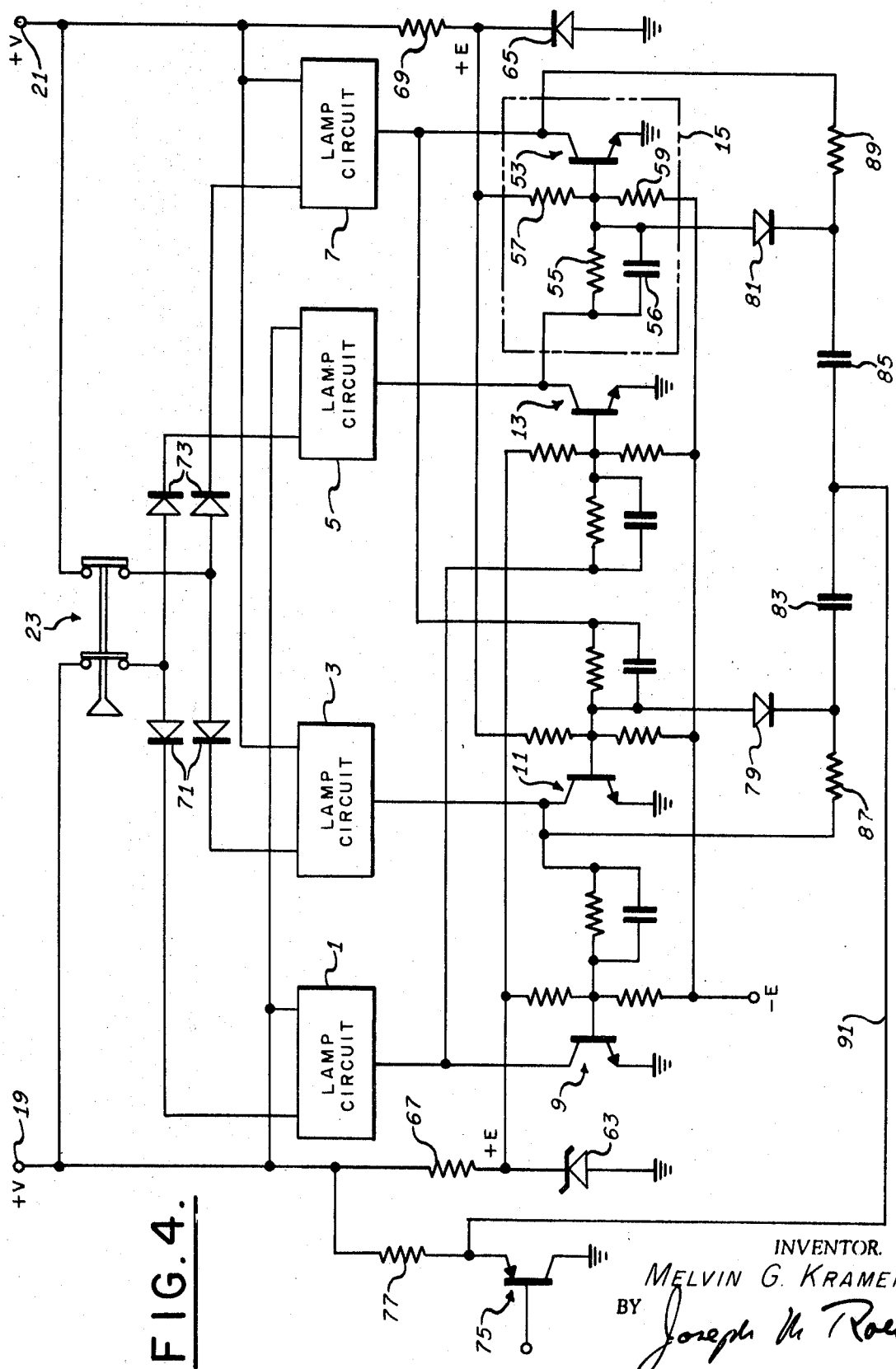
FIG. 4 is a circuit diagram illustrating a presently preferred embodiment of the invention.

FIG. 4 is a diagram of the complete monitor, similar to FIG. 1, but illustrating the biasing and triggering means in greater detail.

The numerals used in FIG. 1 are carried over whenever possible in FIG. 4.

The monitor is energized from the dual source through the lines 19 and 21. Biasing voltages (+E) are provided by the Zener diodes 63 and 65 cooperating with the dropping resistors 67 and 69. The Zener diodes provide a regulated bias voltage that is unaffected by changes in supply voltage.

The pairs of diodes 71 and 73 cooperate to isolate the individual stages during the reset function.

The incoming pulse train is applied to the input transistor 75. This transistor is connected to the source of voltage through the emitter resistor 77. The resulting triggering voltages are applied to the diodes 79 and 81 through the coupling capacitors 83 and 85. The triggering diodes 79 and 81 are also coupled to the collector elements of the transistors in the corresponding voltage level switches through the resistors 87 and 89 respectively.

The pulse train applied to the input transistor 75 normally drives this transistor between saturation and cutoff so as to produce a square wave train on the line 91.

The positive-going portions of the square wave on the line 91 tend to produce positive-going pulses at the diodes 79 and 81, and the negative-going portions of the square wave on the line 91 tend to produce negative-going pulses at the diodes 79 and 81.

It will be remembered that the voltage level switches 11 and 15 operate in an out-of-phase relationship so that when a given trigger pulse occurs, one of these voltage level switches will be in the high-voltage state and the other will be in the low-voltage state.

Assume that the voltage level switch 11 is in the high-voltage state and the voltage level switch 15 is in the low-voltage state. Under these conditions, the transistor in the voltage level switch 11 will be off and a relatively high-collector voltage will appear at the resistor 87. The transistor 53 under these conditions will be on and substantially zero voltage will be applied to the resistor 89 from the collector of the transistor 53. Under these conditions, also, the diode 79 will be back-biased.

Any positive-going pulse applied to the diode 79 will be blocked by that diode. Any negative-going pulse applied to the diode 79 will tend to overcome the back-bias but will not be able to affect the transistor in the voltage level switch 11 because that transistor is already turned off.

Any positive-going pulse applied to the diode 81 through the capacitor 85 is blocked by the diode 81. But a negative-going pulse can pass through the diode 81 and turn off the transistor 53.

Under normal conditions, this causes the reversal of the voltage state of all voltage level switches in a manner explained previously.

Since the voltage states of the voltage level switches 11 and 15 are reversed, the next effective triggering pulse affects the transistor in the voltage level switch 11 but does not directly affect the transistor 53.

Under normal conditions the stages in the monitor are caused to toggle between the two binary states in response to successive input pulses.

Stated in another way, the trigger circuit operates to steer a given pulse to whichever transistor in the voltage level switches 11 and 15 is turned on at that time. A trigger pulse is thus able to switch a voltage level switch only from a low state into the high state.

The fail-safe feature of the monitor was demonstrated by simulating catastrophic failure of each component in all modes. The results showed that no catastrophic first failure would prevent a lamp from being illuminated.

Because of this feature, the monitor is able to detect failures within itself and to immediately light a lamp when such failure occurs. Such failures includes a power supply failure as well as a lamp failure.

If more than momentary interruption of failure, the pulse train occurs, or if there is a component failure, the circuit becomes latched. If the latching was caused by an abnormality in the pulse train, the lamp can only be darkened by resetting the circuit after the pulse train has been restored to normal. If the latching was caused by a component failure, reset is not possible.

Since the reset operation itself causes the lamp to light, failure of the reset switch will keep the lamp illuminated. Furthermore, the circuit has the ability to delay fault indication and not latch if the disturbance persists for longer than a predetermined time.

Although the monitor circuit has been described as useful in detecting failures in pulse trains per se, it will be appreciated that the pulse source itself may be responsive to a variety of conditions which may be monitored by using suitable apparatus to convert the signals of interest into pulse trains that can be accommodated by the monitor.

Figure 5:
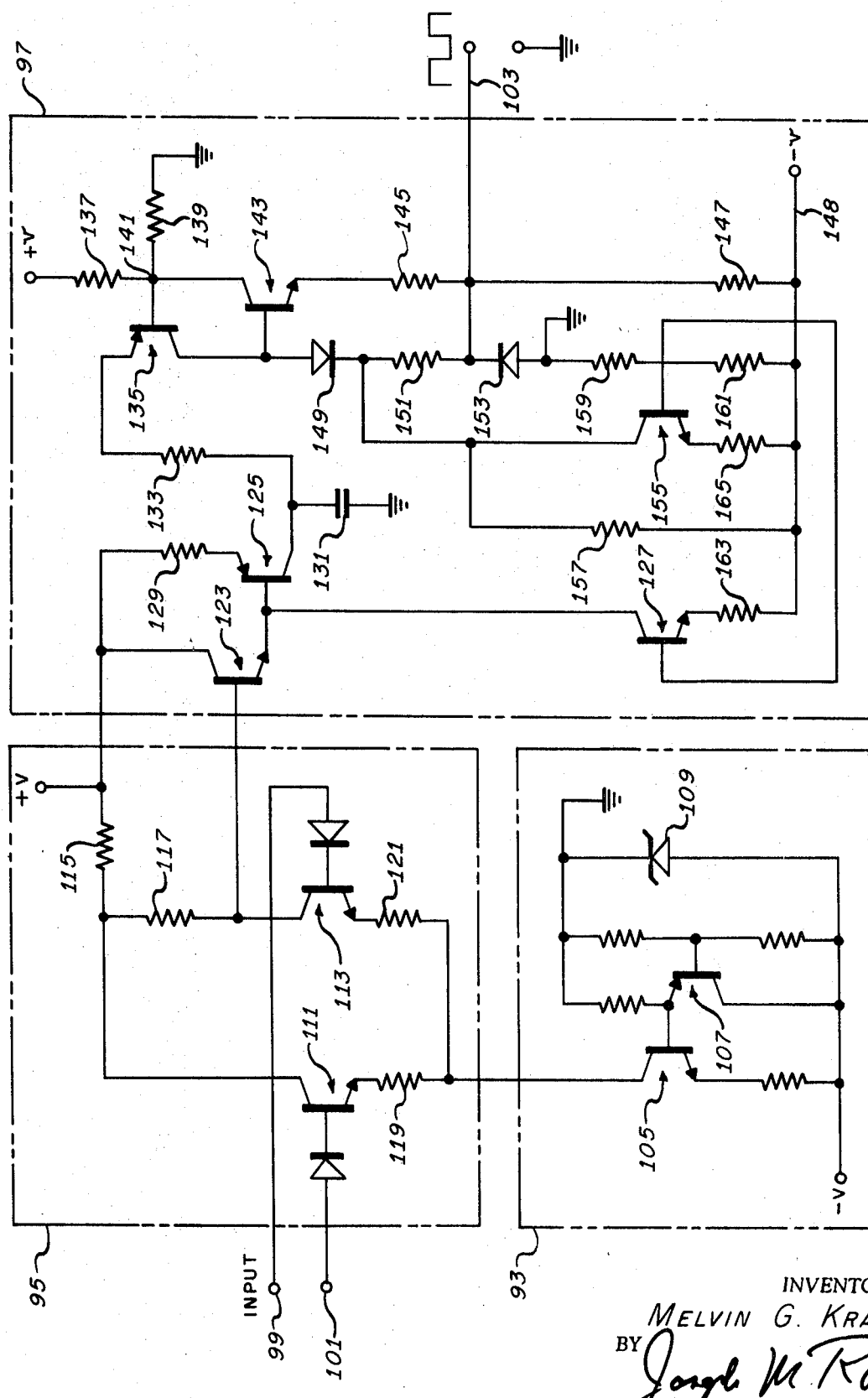
FIG. 5 is a circuit diagram illustrating a particular pulse source that may be used in practicing the invention.

FIG. 5, for instance, illustrates a comparator circuit that may be used as the pulse source 18. The circuit of FIG. 5 compares the voltages of interest and provides pulse trains that are acceptable by the monitor circuit of FIGS. 1-4. If the two voltages to be compared remain equal within specified limits, the comparator circuit produces a pulse train that can be utilized by the monitor circuit. If the two voltages become unequal, however, the pulse train ceases and the monitor indicates a failure. The comparator circuit is further designed so that a failure of any component within the comparator itself terminates the pulse train and thus illuminates a warning lamp in the monitor.

A voltage comparator circuit for this purpose is illustrated in FIG. 5. This comparator circuit contains three units: a constant current source 93, a differential amplifier 95, and an oscillator 97.

As is the case in the monitor circuit, the comparator is designed so that the output is dependent upon every component in the comparator. Every component is kept active and balances are maintained within the comparator through the cooperation of each component.

The oscillator 97 operates only when the voltage from the differential amplifier 95 is maintained within predetermined limits. If the voltage from the amplifier strays beyond these limits the oscillator stops.

Two voltages to be compared are applied to the input terminals 99 and 101. The pulse train output from the comparator is developed at an output terminal 103.

The current source 93 is conventional and contains first and second transistors 105 and 107 and a Zener diode 109 to regulate the base current of the transistor 107. The current source 93 keeps the total current of the differential amplifier 95 constant regardless of impedance changes within the amplifier.

The differential amplifier contains first and second transistors 111 and 113 connected to a source of voltage through a common collector resistor 115. The collector of the transistor 111 is connected directly to the common collector resistor 115 whereas the collector of the transistor 113 is connected to the common collector resistor 115 through a resistor 117. The emitters of the transistors 111 and 113 are connected to the current source through the emitter resistors 119 and 121, respectively. The collector voltage of the transistor 113 is used as an amplifier output voltage and applied to the base of the oscillator input transistor 123. When the voltages applied to the terminals 99 and 101 are equal, the resulting voltage input to the transistor 123 remains substantially constant and in the center of the voltage range for sustained oscillations. When the applied voltages differ, the voltage input to the transistor 123 changes and moves toward one of the voltage limits which will stop the oscillator. The differential amplifier 95 operates in conventional fashion.

The oscillator 97 is arranged so that the oscillator input transistor 123 has its collector terminal connected directly to the source of voltage +V and its emitter connected to the base of a charging transistor 125 and the collector of a transistor 127. The transistor 125 has its emitter connected to the +V voltage source through a resistor 129 and its collector coupled through the oscillator capacitor 131 to ground. The capacitor 131 is also coupled through a series resistor 133 to the emitter of a regenerative transistor 135. The base of the transistor 135 is connected to the junction of a pair of resistors 137 and 139. These resistors are connected between a reference voltage +v and ground. The junction point 141 serves as a reference which will be described.

A second regenerative transistor 143 has its base connected to the collector of the transistor 135 and its collector connected to the reference point 141. The emitter of the transistor 143 is connected through series resistors 145 and 147 to the −v source of voltage through a buss 148. The junction of the resistors 145 and 147 is used to supply an output voltage to the terminal 103. The emitter of the transistor 135 and the base of the transistor 143 are connected through a diode 149, a resistor 151, and a second diode 153 to ground. The junction of the diode 153 and the resistor 151 is also connected to the output terminal 103. A transistor 155 has its collector connected to the resistor 151 and to the buss 148 through the resistor 157. The bias on the base of the transistor 155 is established by the resistors 159 and 101. The bases of the transistors 127 and 155 are connected together and the emitters of these transistors are connected to the buss 148 through the resistors 163 and 165 respectively.

Figure 6:
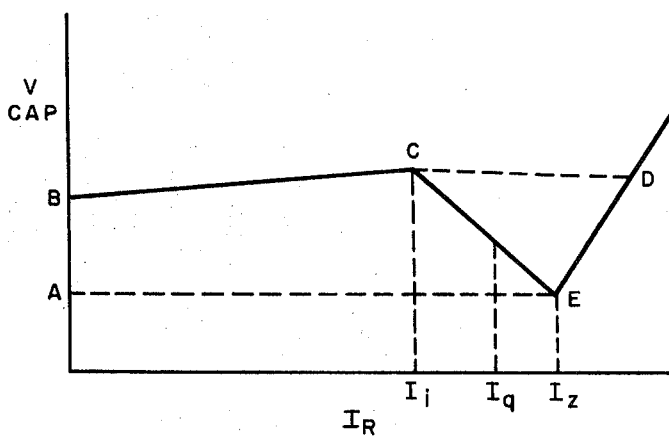
FIG. 6 is a diagram useful in explaining the circuit of FIG. 5.

The operation of the comparator may be understood by referring to the graph of FIG. 6 taken together with the circuit diagram of FIG. 5. The transistors 123, 125 and 127 convert the voltage input to the the current 123 into current at the collector of the transistor 125. The collector current of the transistor 125 serves to charge the impedance 131 which acts as the reactive component of the oscillator.

The impedance characteristics of the circuit looking into the resistor 133 are given in the graph of FIG. 6, wherein $V_{cap}$ is the voltage across the capacitor 131 and $I_R$ is the current through the resistor 133. It will be noted that for input currents between $I_1$ and $I_2$ the input impedance characteristic has a negative slope. The circuit will oscillate providing the current delivered by the transistor 125 is between the limits $I_1$ and $I_2$. If the current falls outside this range, oscillations will stop.

When the input voltages applied to the terminals 99 and 101 are equal, transistor 125 delivers a current indicated as $I_Q$. When the input voltages are unequal, the current moves towards $I_1$ or $I_2$. The operating point path of the input voltage and current is designated by the points A, B, C, D and E in FIG. 6.

The current source transistor 125 causes the voltage on the capacitor 131 to move from point A toward point B. When the capacitor voltage reaches the voltage at the junction of resistor 137 and resistor 139, plus the emitter-to-base drop of transistor 135, this transistor starts to conduct (point B). Current from the transistor 125 is now passed by transistor 135 and the operating point moves from point B toward point C. If the charging transistor 125 is supplying less than $I_1$, the operating point will stop since this is a stable area and the cycle cannot continue. But if the current is greater than $I_1$, the operating point will snap from point C to point D. $I_1$ is the current necessary to cause transistor 143 to start conducting due to the current $I_1$ flowing through the resistor 145. When the transistor 143 starts to conduct, the base voltage of transistor 135 is reduced, thereby producing the regeneration or negative impedance input characteristic. When the operating point reaches point D, the capacitor 131 discharges and this discharge current, in addition to the current from the source, causes the diode 153 to reverse bias so that the output goes to its most positive state. If the capacitor discharges, the operating point moves from point D toward point E. If, when the capacitor is discharged, the current supplied by the transistor 125 is greater than $I_2$, the operating point stops on the positive resistance slope and the cycle cannot continue since this is a stable area. $I_2$ is the current necessary to keep the diode 153 reverse-biased. If the current from the transistor 125 is less than $I_2$, the point snaps from point E to point A and the cycle repeats. Thus it is evident that the current from the transistor 123 must be greater than $I_1$ or the opening point will stop between the points B and C which has a positive slope. Similarly, this current must be less than $I_2$ or the operating point will stop in the region between points D and E which also has a positive slope.

The accuracy of the comparator of FIG. 5 depends on the stability of the limit points $I_1$ and $I_2$. Because of the design of these circuits, these points can be selected and maintained with accuracy. The negative impedance is produced by the transistors 135 and 143. These transistors are connected such that regeneration takes place when the voltage and current into the resistor 133 are in the negative impedance area of FIG. 6.

Point $I_2$ is determined by the diode 153 and the resistor 147. When the current through the resistor 133 exceeds $I_2$, the diode 153 becomes reverse-biased and its impedance changes from the low value of the forward-biased diode to the value of the resistor 147. This resistor typically has a value in the order of 9,000 ohms which produces the steep positive slope above $I_2$.

Point $I_1$ is determined by the resistor 157, the transistor 155, and the resistors 151, 159, 161 and 165. The transistor 155, and its associated components make up a current source which supplies current through the resistor 151 to turn off the transistor 143.

Thus, the transistor 143 cannot conduct so as to provide regeneration until the current supplied by the collector of the transistor 125 through the transistor 135 is equal to the current through the resistor 145 supplied by the transistor 155 and the resistor 157.

The circuit of FIG. 5 is able to detect its own failures and provide an indication for all failures which appreciably degrade its own performance.

The well-defined input range $I_1$–$I_2$ provides sharp cutoff points for limiting the area through which the oscillator will sustain oscillations. The comparator output at terminal 103 of FIG. 5 may be applied directly to the monitor input transistor 75 of FIG. 4.

In this combination, whenever voltages applied to the input terminals 99 and 101 are equal, the monitor will be supplied with a pulse train that prevents any of the warning lamps from becoming illuminated.

Whenever the voltages at the terminals 99 and 101 become sufficiently different, the pulse train supplied to the monitor circuit will cease and one or more warning lamps will indicate a failure.

Similar circuits for detecting various conditions will be apparent to those skilled in the art. Thus, a given voltage may be monitored by applying a reference voltage to one of the comparator input terminals and the voltage to be monitored to the other of these terminals.

Two pulse trains may be compared by providing a second input to the monitor of FIG. 4 and applying trigger signals separately from these inputs to the voltage level switches 11 and 15.

This may be accomplished, for instance, by breaking the line between the capacitors 83 and 85 of FIG. 4 so that the pulses in line 91 are applied only to capacitor 83. A second input circuit similar to the transistor 75 and the resistor 77 may then be connected to the line 21. The collector voltage of this second capacitor may be applied through the capacitor 85 to the voltage level switch 15.

With this arrangement, a different pulse train may be applied to each of the monitor input transistors. If a disparity occurs between these two trains, one or more warning lamps in the monitor circuit will be illuminated.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for detecting interruptions in a pulse train comprising a source of energy, a four-stage regenerative bistable circuit connected in reciprocal pairs so that one pair of stages is driven into a conducting state when the other pair of stages is driven into a nonconducting state during normal operation, said bistable circuit being toggled by individual pulses in said pulse train, individual lamp circuits corresponding to each of said bistable circuit stages, each of said bistable circuit stages being connected in series with the corresponding lamp circuit across said source of energy whereby the junction voltage between the lamp circuit and the corresponding bistable circuit stage is in a low voltage state when that stage is conducting and in a high-voltage state when that stage is nonconducting, a warning lamp in each lamp circuit, a delay means in each lamp circuit arranged to provide a gradually increasing lamp voltage while the associated bistable circuit stage is conducting and a gradually decreasing voltage while the associated bistable circuit stage is not conducting, nonlinear means in each lamp circuit for providing a junction voltage that can exceed a predetermined threshold only when the lamp voltage in that stage is between specified limits, and biasing means in each bistable circuit stage adjusted to permit toggling of that stage only when the junction voltage driving the stage exceeds the threshold value.

2. The apparatus of claim 1 wherein the delay means includes a timing capacitor connected to accumulate charge when the associated bistable circuit is in the conducting state, said capacitor being coupled to the warning lamp in the same lamp circuit so that the lamp voltage increases with increasing capacitor charge.

3. The apparatus of claim 2 in which said delay means further includes a discharge resistor connected across said timing capacitor for discharging said capacitor when the associated bistable circuit stage is in the nonconducting state.

4. The apparatus of claim 3 wherein the nonlinear means includes a lamp transistor connected in series with the lamp in that circuit, said transistor being further coupled to the capacitor in that circuit so that the conductivity of the transistor increases with increasing capacitor charge, said transistor being arranged so that the transistor saturates when the lamp voltage reaches the lower of said specified limits.

5. The apparatus of claim 1 wherein each lamp circuit includes a timing capacitor having one terminal connected to receive voltage directly from said source of energy and a series charging resistor connected between the other terminal of said capacitor and the corresponding bistable circuit stage, and wherein the warning lamp of the same lamp circuit has a first terminal connected directly to the source of energy, said lamp circuit further including a lamp transistor having an emitter electrode connected to a second terminal on said warning lamp, said lamp transistor further having base and collector electrodes connected across said series resistor.

6. The apparatus of claim 5 further including a discharge resistor connected directly across the timing capacitor, said discharge resistor having a resistance that is much larger than the resistance of said series charging resistor, and wherein the resistance of the charging resistor is large with respect to the resistance of the warning lamp.

7. The apparatus of claim 6 wherein each bistable circuit stage includes a switching transistor having base and collector electrodes connected to ground potential and to the series charging resistor of the corresponding lamp circuit respectively, said switching transistor further having a bias electrode coupled to the collector electrode of a switching transistor in one of the bistable circuit stages of the opposite of said reciprocal pairs.

8. The apparatus of claim 7 wherein said biasing means is adjusted to maintain the switching transistor in the cutoff condition when the lamp voltage in the lamp circuit driving that switching transistor is outside said specified limits.

9. The apparatus of claim 8 further including a normally closed reset switch interconnecting said voltage supply and said one terminal of the timing capacitor.

10. A signal monitor comprising first means for producing a voltage pulse train, a source of energy, a four-stage regenerative bistable circuit having the stages connected in reciprocal pairs, second means to toggle said bistable circuit in response to individual pulses from said first means, separate lamp circuits connected in series relationship with each stage in said bistable circuit, each lamp circuit and its corresponding bistable circuit stage being connected across said source of energy whereby the junction voltage between a lamp circuit and the corresponding bistable circuit stage is in a low voltage state when the stage is conducting and in a high-voltage state when that stage is nonconducting, a warning lamp in each lamp circuit, delay means in each lamp circuit for limiting the rate of change of lamp voltage, nonlinear means in each lamp circuit, said nonlinear means being adjusted so that said junction voltage can exceed a predetermined threshold only when the lamp voltage in that stage is between specified limits, and biasing means in each bistable circuit adjusted to permit toggling of that stage only when the junction voltage driving the stage exceeds a threshold value.

11. The monitor of claim 10 in which said means for producing a voltage pulse train comprises a voltage comparator, said comparator including a differential amplifier connected to receive first and second input voltages, means in said differential amplifier for producing an error voltage indicative of the difference between said first and second input voltages, a voltage-responsive oscillator responsive to said error voltage to produce a train of square wave pulses, said oscillator being adjusted to isolate only said error signal within predetermined limits, and means to couple said square wave pulses to said bistable circuit.

12. The monitor of claim 11 in which said oscillator includes a charging transistor for converting said error voltage into a corresponding charging current, a capacitor connected to receive charging current from said charging transistor, a pair of oscillator transistors connected in regenerative relationship, said oscillator transistors being connected to respond to said charging current, means to bias said oscillator transistors to a substantially cutoff condition until said charging current exceeds a first predetermined value, variable ratio voltage-dividing means coupled to said oscillator transistors, said oscillator transistors being connected to pass current from said charging transistor and said capacitor through said voltage-dividing means, said voltage-dividing means including a normally conducting diode and means to back-bias said diode when the current through said oscillator transistors exceeds a second predetermined value, and output means connected to said diode for providing a relatively low output voltage when said diode is conducting and a relatively high output voltage when said diode is back-biased.